US011825359B2

(12) United States Patent
Akl et al.

(10) Patent No.: US 11,825,359 B2
(45) Date of Patent: Nov. 21, 2023

(54) TECHNIQUES FOR USING SIMULTANEOUS CONNECTIVITY FOR MOBILITY OF INTEGRATED ACCESS AND BACKHAUL NODES

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/353,042

(22) Filed: Jun. 21, 2021

(65) Prior Publication Data

US 2022/0408324 A1 Dec. 22, 2022

(51) Int. Cl.
*H04W 36/00* (2009.01)
*H04W 36/12* (2009.01)
*H04W 76/30* (2018.01)
*H04W 76/15* (2018.01)
*H04W 36/18* (2009.01)

(52) U.S. Cl.
CPC ... *H04W 36/0069* (2018.08); *H04W 36/0061* (2013.01); *H04W 36/12* (2013.01); *H04W 36/18* (2013.01); *H04W 76/15* (2018.02); *H04W 76/30* (2018.02)

(58) Field of Classification Search
CPC . H04W 76/15; H04W 36/0069; H04W 76/30; H04W 76/19; H04W 36/18; H04W 36/0061; H04W 36/12; H04W 36/08; H04W 36/14
See application file for complete search history.

(56) References Cited

U.S. PATENT DOCUMENTS

| | | | |
|---|---|---|---|
| 10,791,487 B1 * | 9/2020 | Sung | H04W 36/0066 |
| 11,330,658 B1 * | 5/2022 | Marupaduga | H04W 76/16 |
| 2021/0029597 A1 * | 1/2021 | Xu | H04W 36/0033 |
| 2022/0255689 A1 * | 8/2022 | Wen | H04W 36/00 |
| 2022/0369181 A1 * | 11/2022 | Selvaganapathy | H04W 36/0069 |
| 2023/0098848 A1 * | 3/2023 | Ishii | H04W 36/0055 370/216 |

\* cited by examiner

*Primary Examiner* — Allahyar Kasraian
(74) *Attorney, Agent, or Firm* — ArentFox Schiff LLP

(57) ABSTRACT

Techniques for using simultaneous connectivity for mobility of integrated access and backhaul nodes may include an IAB node establishing a first connection with a first parent node (e.g., second IAB node) associated with a first IAB donor device (e.g., first base station) and establishing a second connection with a second parent node (third IAB node), wherein the second connection is simultaneous with the first connection. The IAB node may also switch the first connection from the first parent node to the second parent node. In doing so, the IAB node may have dual connectivity with the second parent node, where one connection is a master connection and the other connection is a secondary connection.

24 Claims, 12 Drawing Sheets

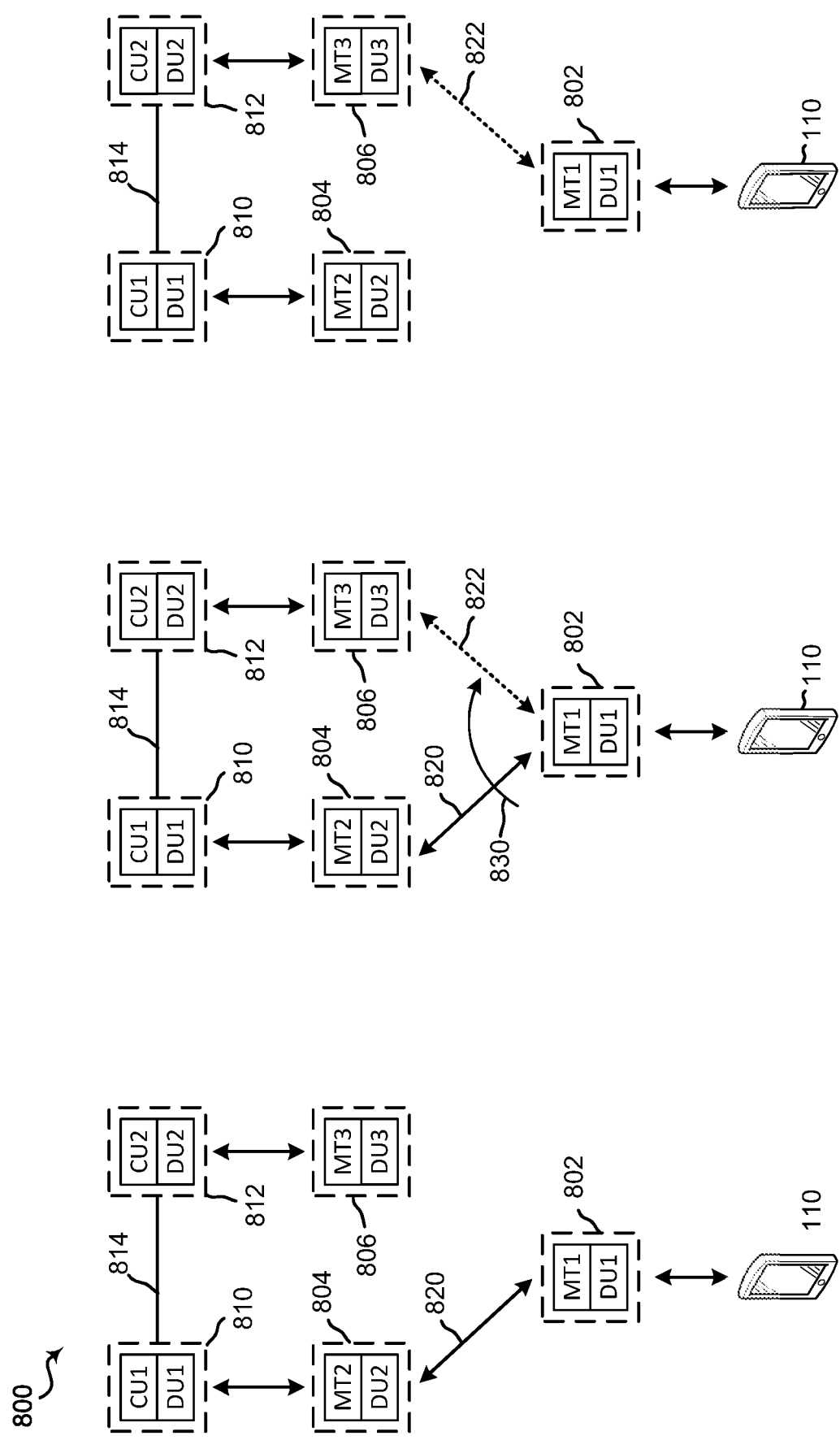

TECHNIQUES FOR USING SIMULTANEOUS CONNECTIVITY FOR MOBILITY OF INTEGRATED ACCESS AND BACKHAUL NODES

TECHNICAL FIELD

Aspects of the present disclosure relate generally to wireless communications, and more particularly, to techniques for using simultaneous connectivity for mobility of integrated access and backhaul (IAB) nodes.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication for a first integrated access and backhaul (IAB) node is provided. The method may include establishing a first connection with a first parent node associated with a first IAB donor device. The method may include establishing a second connection with a second parent node, wherein the second connection is simultaneous with the first connection. The method may include switching the first connection from the first parent node to the second parent node.

In another aspect, a method of wireless communication for a first base station is provided. The method may include establishing a first connection between a first IAB node and a first parent node associated with a control unit of the first base station. The method may include triggering a second connection between the first IAB node and a second parent node, wherein the second connection is simultaneous with the first connection. The method may include triggering the first connection to be switched by the first IAB node from the first parent node to the second parent node.

In another aspect, a method of wireless communication for a second base station is provided. The method may include establishing a second connection between a first IAB node and a second parent node associated with a second control unit of the second base station, wherein the first IAB node has a first connection between a first IAB node and a first parent node associated with a first control unit of a first base station. The method may include receiving, from the first base station, a request to switch the first connection from the first parent node to the second parent node. The method may include triggering the first connection to be switched by the first IAB node from the first parent node to the second parent node.

In other aspects, apparatus and computer-readable mediums for performing the above-disclosed methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 8A-8C are block diagrams of an example IAB inter-donor topology adaptation scheme, according to aspects of the present disclosure;

DETAILED DESCRIPTION

Figure 1:
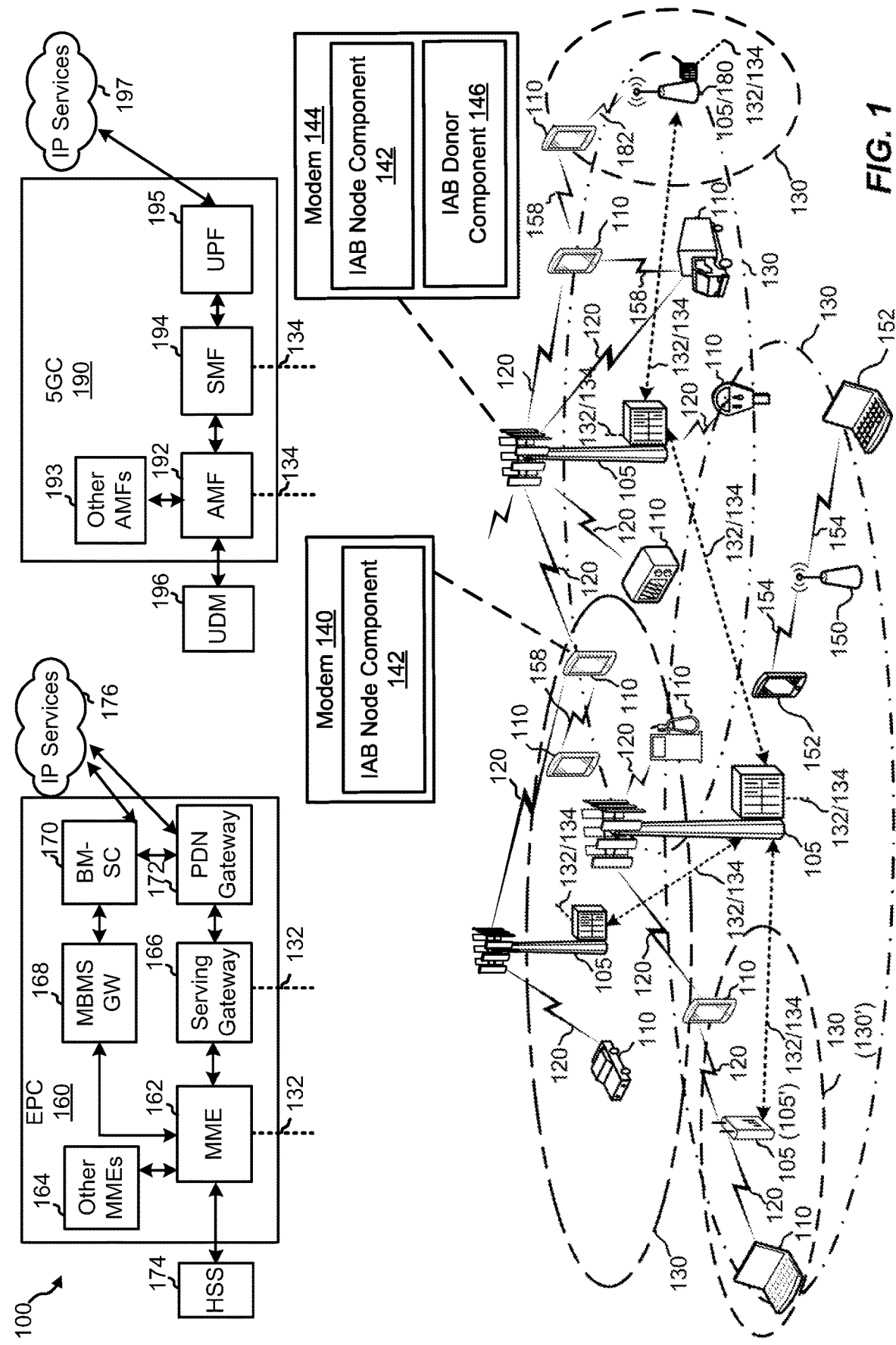
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Donor migration (or MN handovers) may allow an IAB node (e.g., UE) the ability to switch from a source MN to a target MN, when, for example, the link quality with the source MN is degrading or the IAB node is moving from a coverage area associated with the source MN to a coverage area associated with the target MN. Further, for increased connectivity, the IAB node may be connected to a source secondary node (SN) and may have the ability to switch (e.g., handover) from the source SN to a target SN. Conventionally, the source MN, the target MN, the source SN, and the target SN are distinct devices. However, conventional techniques do not address procedures for the IAB node to perform a handover from the source MN to the source SN (e.g., target MN is source SN).

Aspects of the present disclosure are directed towards techniques in which the IAB node may establish a first connection with a first parent node (e.g., second IAB node) associated with a first IAB donor device (e.g., first base station), establish a second connection with a second parent node (third IAB node), wherein the second connection is simultaneous with the first connection, and switch the first connection from the first parent node to the second parent node. In doing so the IAB node may have dual connectivity with the second parent node, where one connection is a master connection and the other connection is a secondary connection.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In an example, a UE 110 may include a modem 140 and/or an IAB node component 142 configured to use simultaneous connectivity for IAB mobility. In another example, a base station 105 may include a modem 144 and/or an IAB node component 142 configured to use simultaneous connectivity for IAB mobility, and/or the modem 144 and/or an IAB donor component 146 for configuring simultaneous connectivity for IAB mobility.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as internet-of-things (IoT) devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
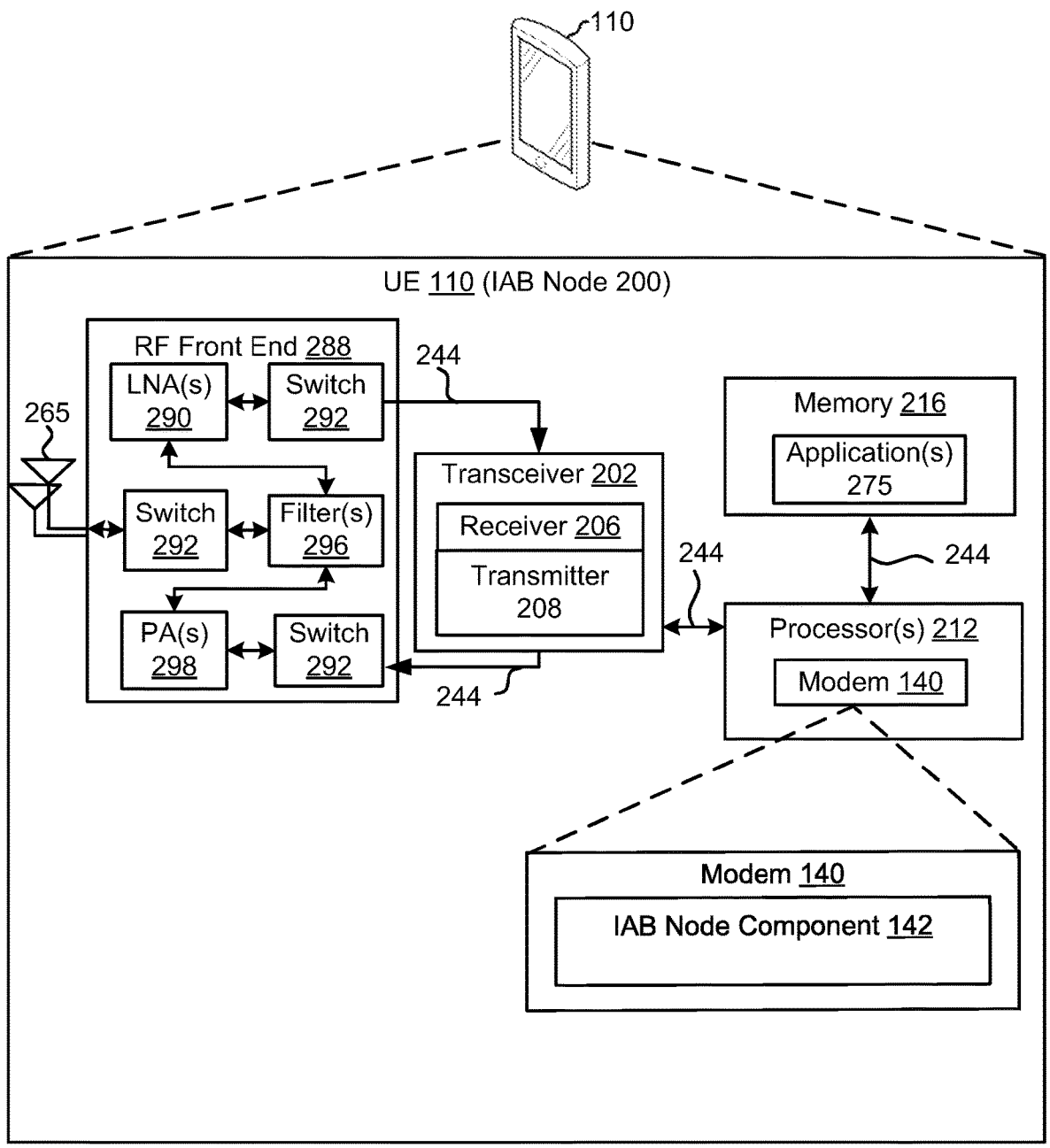
FIG. 2 is a schematic diagram of an example of a user equipment (UE) of FIG. 1, according to aspects of the present disclosure.

Referring to FIG. 2, an example implementation of the UE 110 may include the modem 140 having the IAB node component 142. The modem 140 and/or the IAB node component 142 of the UE 110 may be configured to use simultaneous connectivity for IAB mobility, as described in further detail herein.

In some implementations, the UE 110 may include a variety of components, including components such as one or more processors 212 and memory 216 and transceiver 202 in communication via one or more buses 244, which may operate in conjunction with the modem 140 and/or the IAB node component 142 to enable one or more of the functions described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the IAB node component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the IAB node component 142 may be performed by the transceiver 202.

Also, the memory 216 may be configured to store data used herein and/or local versions of applications 275 or the IAB node component 142 and/or one or more subcomponents of the IAB node component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the IAB node component 142 and/or one or more subcomponents of the IAB node component 142, and/or data associated therewith, when the UE 110 is operating at least one processor 212 to execute the IAB node component 142, and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the base stations 105 or one or more cells associated with one or more of the base stations 105. In an aspect, for example, the modem 140 may configure the transceiver 202 to operate at a specified frequency and power level based on a UE configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use. In another aspect, the modem configuration may be based on UE configuration information associated with the UE 110 as provided by the network (e.g., base station 105).

Figure 3:
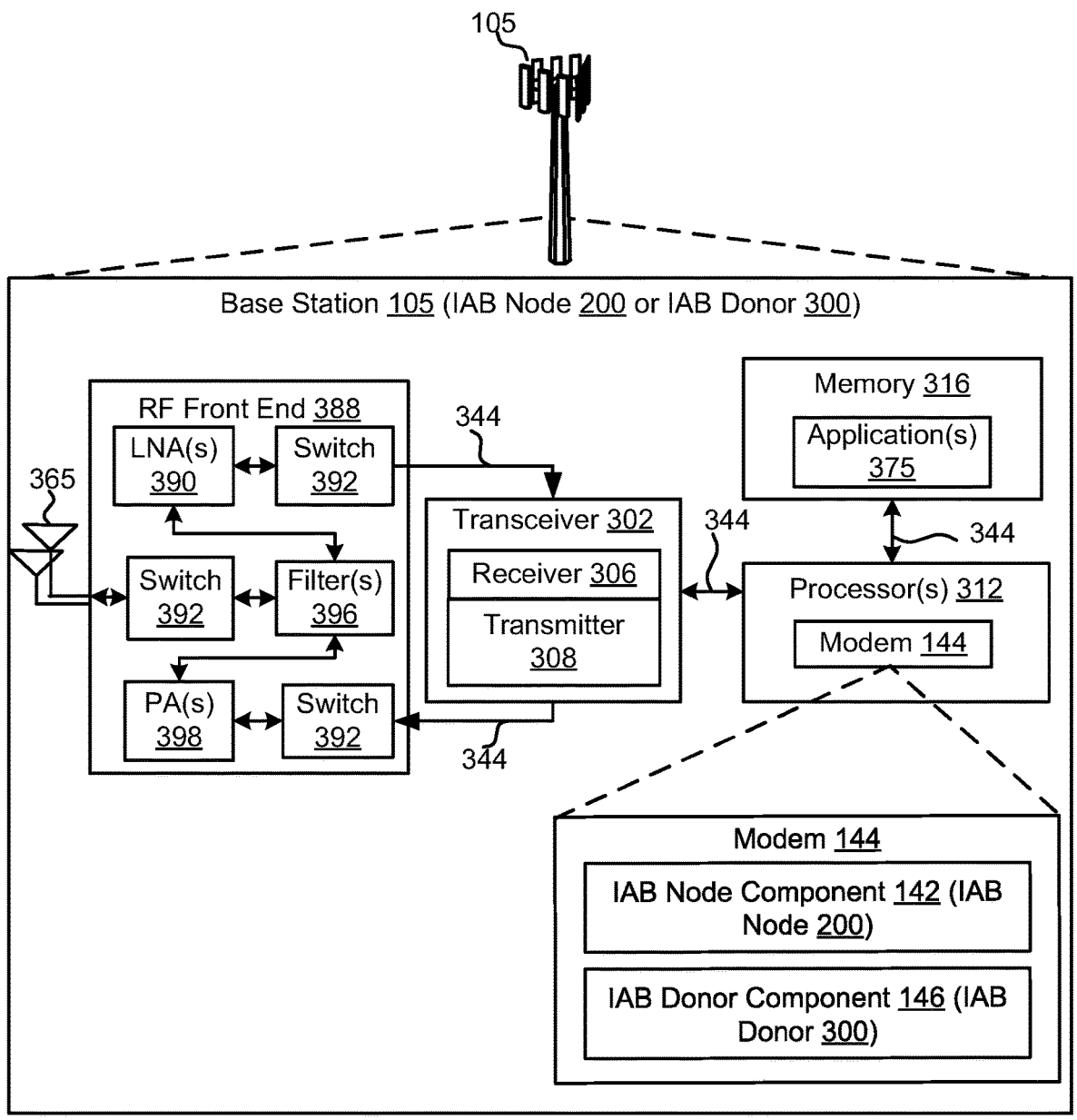
FIG. 3 is a schematic diagram of an example of a base station of FIG. 1, according to aspects of the present disclosure.

Referring to FIG. 3, an example implementation of the base station 105 may include a modem 144, the IAB node component 142 configured to use simultaneous connectivity for IAB mobility, and/or the IAB donor component 146 for configuring simultaneous connectivity for IAB mobility. In some implementations, the base station 105 may include a variety of components, including components such as one or more processors 312 and memory 316 and transceiver 302 in communication via one or more buses 344, which may operate in conjunction with the modem 144, the IAB node component 142, and/or the IAB donor component 146 to enable one or more functions described herein. Further, the one or more processors 312, the modem 144, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 144 that uses one or more modem processors. The various functions related to the IAB node component 142 and/or the IAB donor component 146 may be included in the modem 144 and/or the processors 212 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302.

Additionally, the modem 144 may configure the base station 105 and the processors 312. In other aspects, some of the features of the one or more processors 312 and/or the modem 144 associated with the IAB node component 142 and/or the IAB donor component 146 may be performed by the transceiver 302.

Also, the memory 316 may be configured to store data used herein and/or local versions of applications 375, the IAB node component 142, the IAB donor component 146, and/or one or more subcomponents of the IAB node component 142 and/or the IAB donor component 146 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the IAB node component 142, the IAB donor component 146, and/or one or more subcomponents of the IAB node component 142 and/or the IAB donor component 146, and/or data associated therewith, when the base station 105 is operating at least one processor 212 to execute the IAB node component 142, the IAB donor component 146, and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by other base stations 105 or wireless transmissions transmitted by the UE 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, transceiver may be tuned to operate at specified frequencies such that the base station 105 may communicate with, for example, the UE 110 or one or more cells associated with one or more base station 105. In an aspect, for example, the modem 144 may configure the transceiver 302 to operate at a specified frequency and power level based on the base station configuration of the base station 105 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the base station 105 (e.g., RF front end 388, transceiver 302) to enable transmission and/or reception of signals from the network based on a specified modem configuration. In an aspect, the modem configuration may be based on the mode of the modem 144 and the frequency band in use. In another aspect, the modem configuration may be based on a base station configuration associated with the base station 105.

In an aspect, when a base station 105 uses mmW technologies for high throughput, these signals may suffer from high attenuation from over the air interference, resulting in a cell service area being smaller than a typical signals. Thus, an increased number of base stations 105 with a fiber backhaul may be required for a geographic area, as compared to some non-mmW technologies, which may be cost prohibitive.

Figure 4:
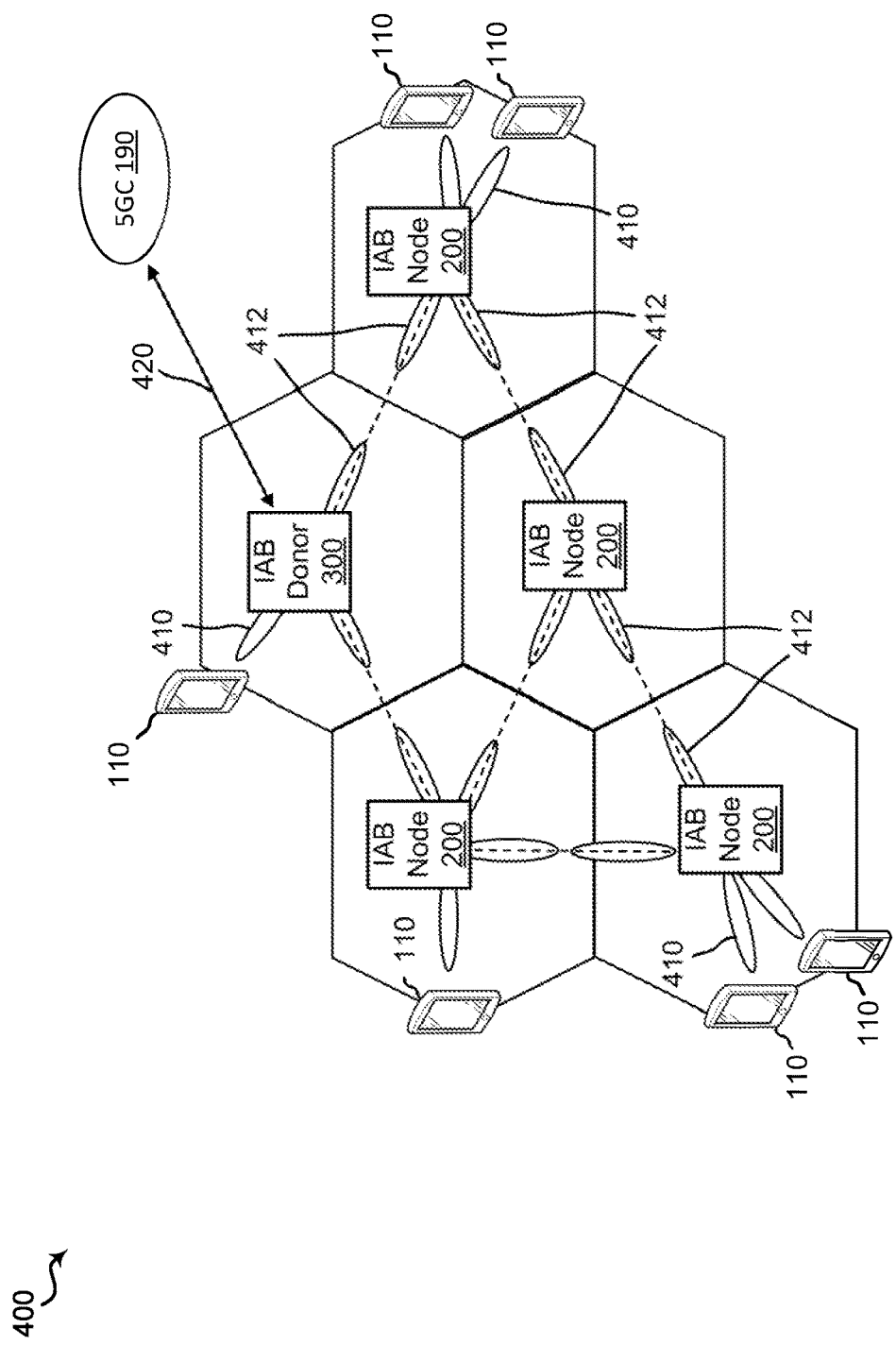
FIG. 4 is a block diagram of an example integrated access and backhaul (IAB) network, according to aspects of the present disclosure.

Referring to FIG. 4, an IAB network 400 may incorporate 5G NR technologies, such as mmW, to support an access network between access nodes and UEs 110, and a backhaul network between access nodes including one or more IAB donors 300, which are access nodes with a wireline connection 420 to the core network 190, and one or more IAB nodes 200, which are access nodes that relay traffic from/to the IAB donor 300 through one or more hops (e.g., other IAB nodes 200).

In an aspect, the IAB network 400 shares the resources between access nodes and backhaul by selectively using wireless technologies for access wireless links 410 and backhaul wireless links 412 to get connections to the IAB donor 300, IAB nodes 200, and UEs 110. Thus, in the IAB network 400, framework for an access network is reused as much as possible.

Figure 5:
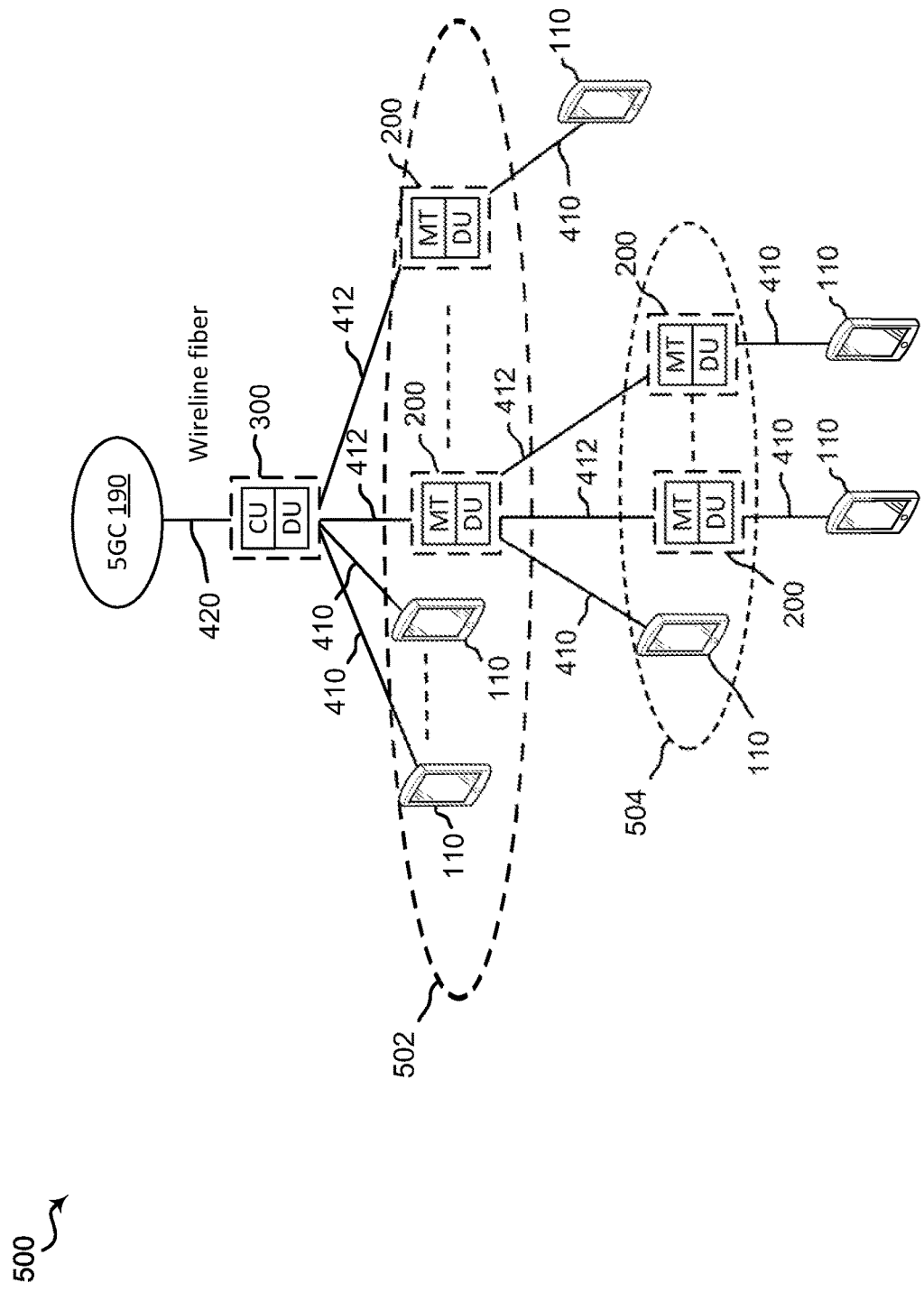
FIG. 5 is a block diagram of another example IAB network, according to aspects of the present disclosure.

Referring to FIG. 5, is another example IAB network 500 including additional details of the IAB donor 300 and the IAB node 200. In this example, the IAB donor 300 may use a split architecture which does not include all protocol stacks integrated at a single entity. Instead the protocol stack split such that a lower stack is for resource scheduling and an upper stack is for resource control.

In an aspect, the IAB donor 300 may be an enhanced base station node with functions to control the IAB network 500. The IAB donor 300 may include a central unit (CU) that controls the whole IAB network 500 through device configuration. In an example, the CU may hold radio resource control (RRC) layer functions or packet data convergence protocol (PDCP) layer functions. The IAB donor 300 may also include a distributed unit (DU) that schedules child nodes 502 of the IAB donor 300. In an example, the DU may hold radio link control (RLC) layer functions, medium access control (MAC) layer functions, or physical (PHY) layer functions.

In an aspect, the IAB node 200 may be a layer 2 (L2) relay node consisting of mobile termination (MT) and DU functions. The MT may act as a scheduled node similar to a UE 110 scheduled by its parent IAB node 200 or parent IAB-donor 300. For the IAB node 200, the DU may act as a scheduling node that schedules child nodes of this IAB-node.

Figure 6:
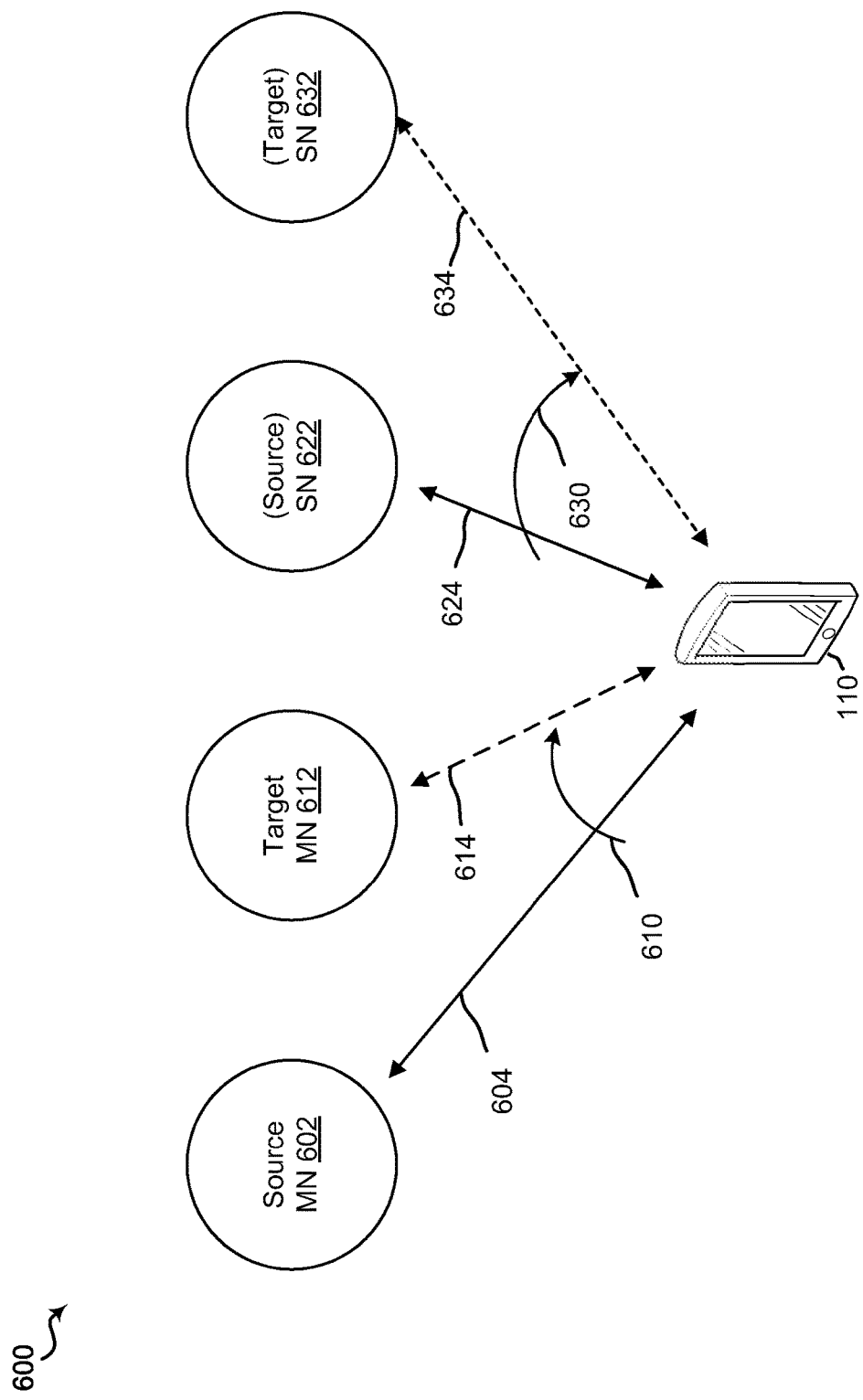
FIG. 6 is a block diagram of an example inter-master node handover with or without a secondary node change, according to aspects of the present disclosure.

Referring to FIG. 6, an example of an inter-master node handover with or without a secondary node change is described. In an example, the UE 110 may be dual connected to a source master node (MN) 602 (e.g., first base station 105) via link 604 and a source secondary node (SN) 622 (e.g., second base station 105) via link 624. In an example, the UE 110 may perform a handover 610 (or switch) from the source MN 602 to a target MN 612 (e.g., third base station 105). For example, the UE 110 may determine the link 614 with the target MN 612 has a better quality signal than the link 604 with the source MN 602, or the UE 110 may need to switch due to movement from a coverage area corresponding to the source MN 602 to a coverage area corresponding to the target MN 612.

In an example, when the UE 110 performs the handover 610, the UE 110 may keep the source SN 622 or perform a second handover 630 from the link 624 with the source SN 622 to a link 634 with a target SN 632 (e.g., fourth base station 105). During the first handover 610, the target MN 612 may need to know which SN (source SN 622 or target SN 632) the UE 110 will connect to, so the target MN 612 can communicate with the SN. For example, the target MN 612 may indicate to the SN that the SN is being designated as the SN for the UE 110. In some examples, the source MN 602 may communicate to the target MN 612 that the original SN will connect to the UE 110. In some examples, the target MN 612 may decide whether to keep the original SN or switch to a new SN.

Figure 7:
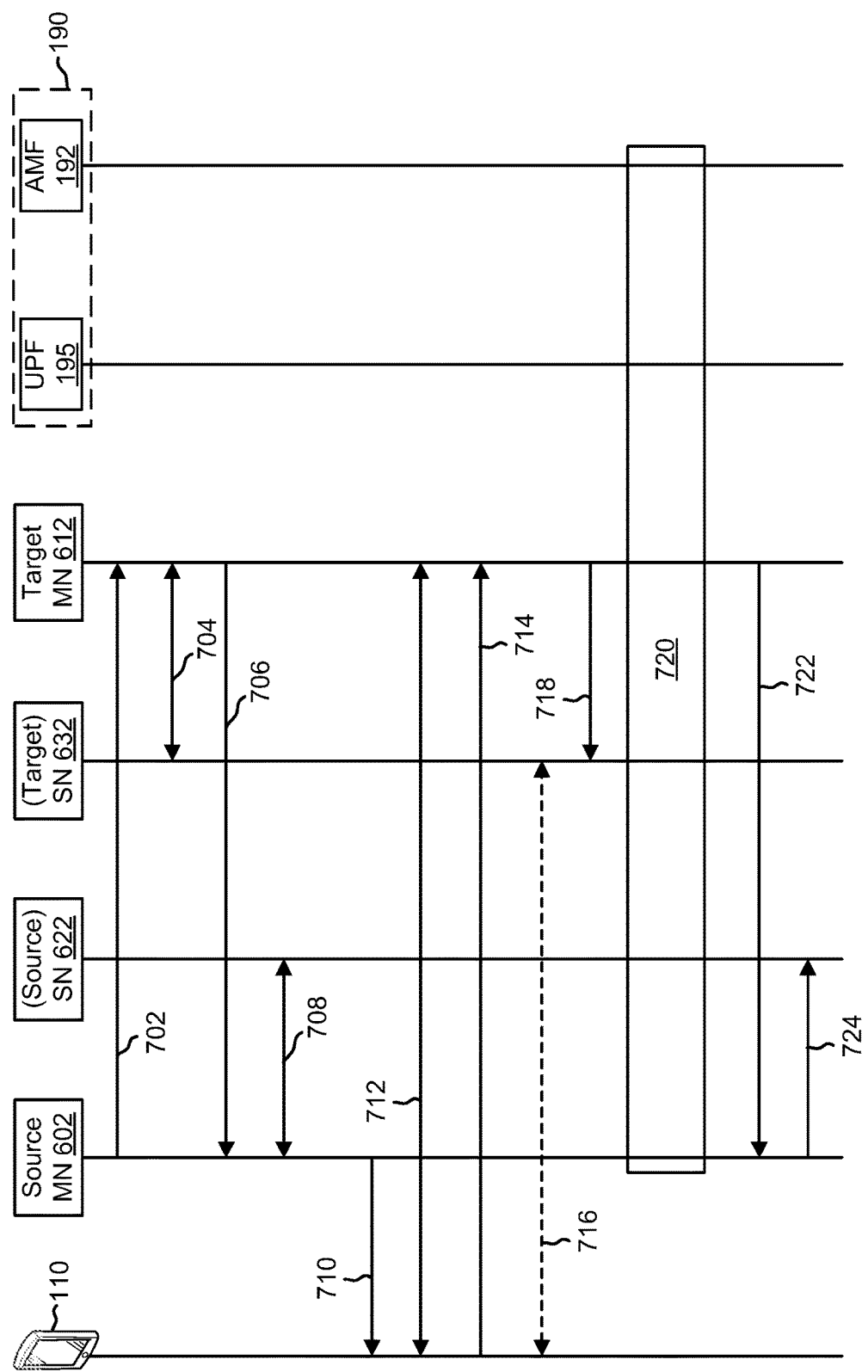
FIG. 7 is a call flow diagram of the example inter-master node handover with or without a secondary node change of FIG. 6, according to aspects of the present disclosure.

Referring to FIG. 7, an example call flow diagram 700 for the inter-master node handover with or without a secondary node change is described. In this example, the source SN 622 may be a different device from the target SN 632 (e.g., different base stations 105), if the UE 110 is switching SNs, or may be the same device, if the UE 110 is retaining the same SN.

In an example, the source MN 602 may send a handover request 702 to the target MN 612. In response to receiving the handover request 702, the target MN 612 and the target SN 632 exchange communications 704 adding the target SN 632. The communications 704 may including, for example, an SN addition request, sent by the target MN 612 that is acknowledged by the target SN 632. The target MN 612 may also send a handover request acknowledgment 706 to the source MN 602 to acknowledge the handover request 702.

In response to receiving the acknowledgement 706, the source MN 602 and the source SN 622 may exchange communications 708 to release the source SN 622. The communications 708 may include, for example, an SN release request sent by the source MN 602 that is acknowledged by the source SN 622, along with other communications.

The source MN 602 may send an indication 710 (e.g., RRC connection reconfiguration signal) to the UE 110 to trigger the handover and thereby release the UE 110 from the source MN 602. In response to the indication 710, the UE 110 may connect with target MN 612 via, for example, a random access procedure 712. Further, the UE 110 may send a completion signal 714 to the target MN 612 to indicate the RRC connection reconfiguration is complete. Optionally, a second random access procedure 716 may be performed to allow the UE 110 to communicate with the target SN 632, when the source SN 622 and the target 632 are different devices. The target MN 612 may send an indication 718 to the target SN 632 (whether source SN 622 and target SN 632 are the same device or different devices) to indicate that the SN reconfiguration is complete.

Communications 720 between the source MN 602, the source SN 622, the target SN 632, the target MN 612, and the core network 190 (including AMF 192 and UPF 195) may occur to allow the core network 190 to route traffic for the UE 110 with the target MN 612 and the target SN 632.

Once the core network 190 routes the traffic for the UE 110 based on the handovers, the target MN 612 sends a context release message 722 to the source MN 602 to indicate to the source MN 602 that the source MN 602 no longer needs to keep the context of the UE 110. In response, the source MN 602 releases the context of the UE 110, and may send a context release message 724 to the source SN 622 to also release the context of the UE 110.

Conventionally, the UE 110 switches between the source MN 602 and the target MN 612, and the source SN 622 and the target SN 632, where these four devices are distinct from each other. Alternatively, the UE 110 switches between the source MN 602 and the target MN 612 and the source SN 622 stays the same, where these three device are distinct from each other.

The present disclosure focuses on aspects of the UE 110 switching from the source MN 602 to the target MN 612, where the target MN 612 is the same device as the SN (source SN 622, if UE 110 is not switching SNs, or target SN 632, if UE 110 is switching SNs). Use of the same MN and SN being collocated thereby the UE 110 may have two connections to the same base station 105.

Referring to FIGS. 8A-8C, an example IAB inter-donor topology 800 may allow an inter-donor migration of a first IAB node 802. As illustrated by FIG. 8A, a source path 820 may communicatively couple the first IAB node 802 with a first IAB donor 810 via a second IAB node 804. In an example, the first IAB node 802 may connect with the first IAB donor 810 via an RRC connection with MT1 of the first IAB node 802 and an F1 connection with DU1 of the first IAB node 802. Further, the first IAB donor 810 may connect via a backhaul link 814 to a second IAB donor 812. As illustrated by FIG. 8B, the first IAB node 802 may migrate from the first IAB donor 810 to the second IAB donor 812 by performing a handover 830 from the source path 820 to a target path 822 to connect the first IAB node 802 with the third IAB node 806. Referring to FIG. 8C, by switching to the target path 822, the source path 820 is released, thereby leaving the single connection (e.g., target path 822) for the first IAB node 802. In this example, the IAB nodes 802, 804, and 806 may be examples of the IAB node 200 of FIG. 2, and the IAB donors 810 and 812 may be examples of the IAB donor 300.

In an aspect, the inter-donor migration of the first IAB-node 802 may involve migration of the MT1 of the first IAB node 802, the migration of the DU1 of the first IAB node 802, and the migration of any children or descendant nodes, such as UE 110.

In an example, the migration of the child may involve, for example, delivery of an RRC reconfiguration message (e.g., handover command) to the UE 110 via the F1 connection between CU1 of the first IAB donor 810 (e.g., source donor) and the first IAB-node 802, and also delivery of an RRC reconfiguration complete message from the UE 110 (e.g., child via the F1 connection between CU2 of the second IAB donor 812 (e.g., target donor) and the first IAB-node 802. This implies connectivity by the first IAB node 802 may be needed to both CU1 of the first IAB donor 810 and CU2 of the second IAB donor 812.

In an aspect, when MT1 of the first IAB node 802 has one connection, this means that only the source path 820 is available to connect to either CU1 of the first IAB donor 810 or CU2 of the second IAB donor 812 before MT1 of the IAB node 802 switches parents (e.g., second IAB node 804 to third IAB node 806). Alternatively, one connection may mean that only the target path 822 is available to connect to either CU1 of the first IAB donor 810 or CU2 of the second IAB donor 812 before MT1 of the IAB node 802 switches parents (e.g., IAB node 804 to IAB node 806). However, donor migration is more robust when both the source path 820 and the target path 822 are available, as described in more detail herein. For example, donor migration by the first IAB node 802 may simultaneous connect MT1 of the first IAB node 802 to both parents (e.g., second IAB node 804 and third IAB node 806).

However, conventional techniques for donor migration may not allow dual connectivity when performing a handover. NR-dual connectivity (NR-DC) may be used to establish simultaneous connectivity of the migrating IAB-MT (e.g., MT1 of first IAB node 802) to the two parent nodes (e.g., DU2 of the second IAB node 804 and DU3 of the third IAB node 806). For the migration of child/descendant UEs, MTs of an IAB node, or DUs of an IAB node, after MT1 of the first IAB node 802 establishes simultaneous connectivity to the two parent nodes. Either or both the source path 820 and target path 822 may be used to exchange messages by way of the third IAB node 806 and either or both CU1 of the first IAB donor 810 and/or CU2 of the second IAB donor 812.

For the migration of MT1 of the first IAB node 802, after the first IAB node 802 establishes simultaneous connectivity to the two parent nodes (e.g., DU2 of the second IAB node 804 and DU3 of the third IAB node 806), one of two scenarios may occur. In a first scenario, CU2 of the second IAB donor 812 may become the MN of MT1 of the first IAB node 802, CU1 of the first IAB donor 810 may become the SN of MT1 of the first IAB node 802, and then SN is released. However, in this first scenario, MN/SN switching is not supported. In a second scenario, the MN role of CU1 of the first IAB donor 810 and the SN role for CU2 of the second IAB donor 812 as applied to MT1 of the first IAB node 802 are not switched, but the source path to the second IAB node 804 may be released. However, in this secondary scenario, a master cell group (MCG) link cannot be released permanently while keeping a second cell group (SCG) link.

Figure 9A:
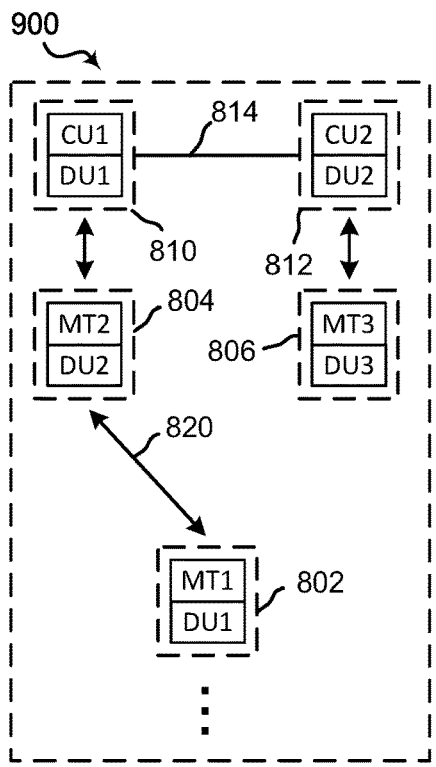
FIGS. 9A-9D are block diagrams of an example IAB inter-donor topology adaptation scheme using dual connectivity, according to aspects of the present disclosure.
Figure 9B:
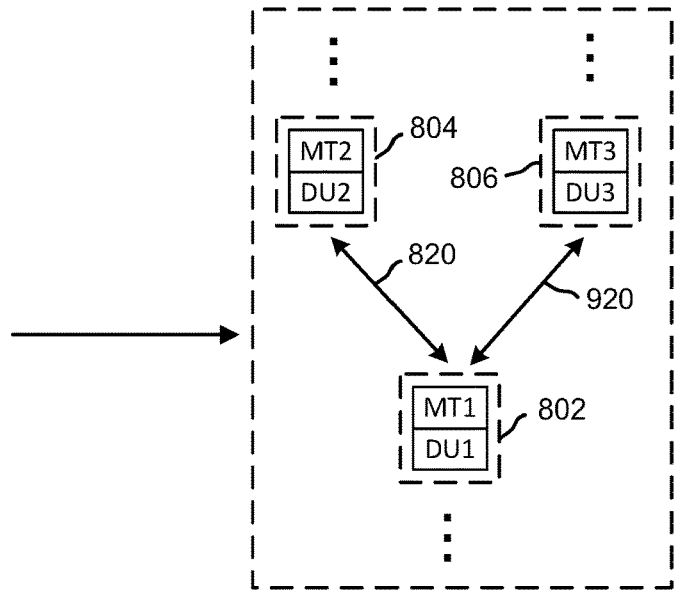

For either of the scenarios, permanent migration of MT1 of the first IAB node 802 to a new donor using NR-DC is not supported Referring to FIGS. 9A-9D, an example IAB inter-donor topology adaptation scheme 900 using dual connectivity is provided. As illustrated by FIG. 9A, the source path 820 may connect the first IAB node 802 to the first IAB donor 810 via the second IAB node 804, as described for FIG. 8A. As illustrated by FIG. 9B, when performing donor migration, the first IAB node 802 may establish dual connectivity with the second IAB node 804 via the source path 820, and with the third IAB node 806 via a second path 920. In an example, dual connectivity may be performed by MT1 of the first IAB node 802 using, for example, NR-DC.

Figure 9C:
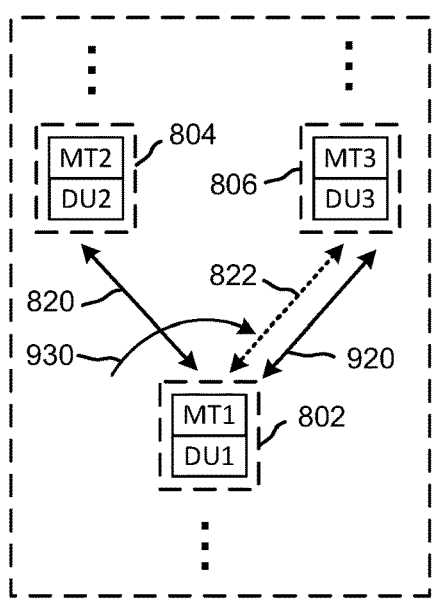
Figure 9D:
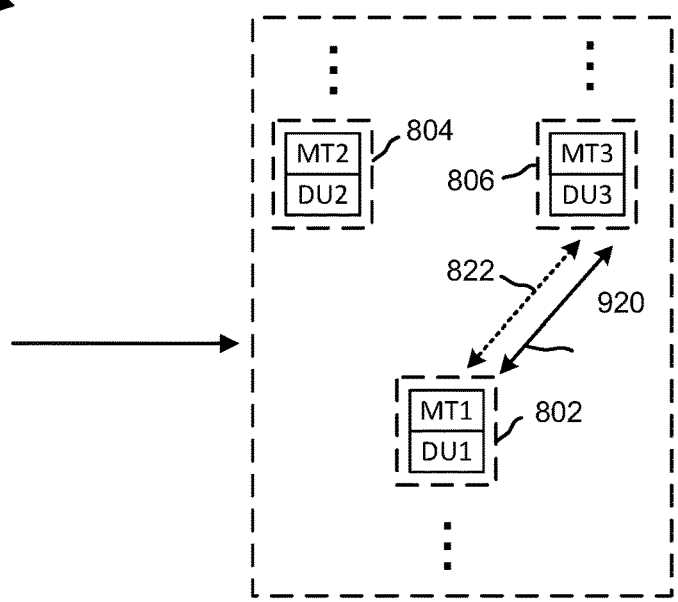

As illustrated by FIG. 9C, a MN handover 930 may be performed to switch the MN (e.g., second IAB node 804) to the SN (e.g., third IAB node 806). In doing so, the source path 820 is switched to the target path 822, and the source path 820 is released. As illustrated by FIG. 9D, the first IAB node 802 may now have two paths, target path 822 (which is now source MN path) and second path 920 (which becomes the SN path) for connecting to the IAB node 806. In some examples, the second path 920 (or SN path) may be released upon connection of the target path 822 between the first IAB node 802 and the IAB node 806.

In an aspect, the first IAB node 802 may establish a first connection (e.g., source path 820) with a first parent node (e.g., second IAB node 804) associated with the first IAB donor 810. The first IAB node 802 may also establish a second connection (e.g., second path 920) to a second parent node (e.g., third IAB node 806), where the second connection is simultaneous (e.g., overlaps in time or is performed simultaneously in time) with the first connection. Next, the first IAB node 802 may switch the first connection from the first parent node to the second parent node (e.g., establish target path 822), thereby the first connection and the second connection are collocated between the first IAB node 802 and the second parent node. The second connection may then be terminated.

In an example, the second parent node may be associated with the first IAB donor 810. In another example, the second parent node may be associated with the second IAB donor 812.

In an example, the first connection may be switched to a same cell served by the second parent node as that of the second connection. In another example, the first connection may be switched to a different cell served by the second parent node as that of the second connection. In some examples, the two cells may have different physical cell identifications (PCIs) that are broadcast from an interface, NR cell identifications (NCIs) (or cell group identifiers (CGIs)) that are global identifiers to uniquely identify a cell, or frequencies on which cell communications occur.

In an example, the first IAB node 802 may establish the two simultaneous connections using one of NR-DC technology, multi-radio access technology (RAT)-DC (MR-DC) technology (e.g., one IAB donor is configured for a first technology such as 5G NR and a second IAB donor is configured for a second technology such as LTE), multi-MT technology (e.g., when IAB node comprises multiple MTs such that a first MT connects to a first IAB donor and a second MT connects to a second IAB donor), or dual active protocol stack (DAPS) technology.

In an example, the first IAB node 802 may release one of the first connection or the second connection after the first connection is switched to the second parent node. In some examples, the second connection may be automatically released upon switching the first connection to the second parent node.

In another example, the first IAB node 802 may switch the second connection to a third parent node/cell. For example, the first IAB node may first switch the first connection from the first parent node to the second parent node, and then switch the second connection from the second parent node to the third parent node. In another example, the first IAB node 802 may concurrently switch the first connection from the first parent node to the second parent node and the second connection from the second parent node to the third parent node.

In an example, the first IAB node 802 may indicate to the network a capability of the first IAB node 802 to switch a first of two connections to the same parent node or cell as that of the second connection.

In another example, the first IAB node 802 may be one of a base station 105, a UE 110, or any other relay device.

In an aspect, the first IAB donor 810 may establish a first connection (e.g., source path 820) to communicatively couple the first IAB node 802 with a first parent node (e.g., second IAB node 804) associated with CU1 of the first IAB donor 810. The first IAB donor 810 may trigger the establishment of a second simultaneous connection (e.g., second path 920) to communicatively couple the first IAB node 802 with a second parent node (e.g., third IAB node 806). The first IAB donor 810 may also trigger the switching of the first connection of the first IAB node 802 from the first parent node to the second parent node, and terminate the second connection In another aspect, the second IAB donor 812 may establish a second simultaneous connection (e.g., second path 920) to communicatively couple the first IAB node 802 with a second parent node (e.g., third IAB node 806) associated with CU2 of the second IAB donor 812, where the first IAB node 802 has a first connection (e.g., source path 820) to communicatively couple the first IAB node 802 with a first parent node (e.g., second IAB node 804) associated with CU1 of the first IAB donor 810. The second IAB donor 812 may also receive a request to switch the first connection of the first IAB node 802 from the first parent node to the second parent node, and terminate the second connection. The second IAB donor 812 may also trigger the switching of the first connection of the first IAB node 802 to the second parent node.

In an aspect, the first IAB donor 810 (e.g., CU1) or the second IAB donor 812 (e.g., CU2) associated with the second parent node may request to establish (i.e. switch) the first connection of the first IAB node 802 at the second parent node. In a first example, the IAB donor (e.g., CU1 of first IAB donor 810 or CU2 second IAB donor 812) may indicate to the second parent node that the second parent node serves the first IAB node 802 on the second connection. In a second example, the IAB donor (e.g., CU1 of first IAB donor 810 or CU2 second IAB donor 812) may request from the second parent node separate resources for the first connection and the second connection of the first IAB node 802 to communicatively couple with the second parent node. In a third example, the IAB donor (e.g., CU1 of first IAB donor 810 or CU2 second IAB donor 812) may request from the second parent node combined resources for the first connection and the second connection of the first IAB node 802 to communicatively couple with the second parent node. In a fourth example, the IAB donor (e.g., CU1 of first IAB donor 810 or CU2 second IAB donor 812) may request from the second parent node to release the second connection.

In another aspect, the first IAB donor 810 (e.g., CU1) may request from the second IAB donor 812 (e.g., CU2) to switch the first connection of the first IAB node 802 to communicatively couple the first IAB node 802 with the second parent node associated with the second IAB donor 812 (e.g., CU2), and terminate the second connection of the first IAB node 802.

Figure 10:
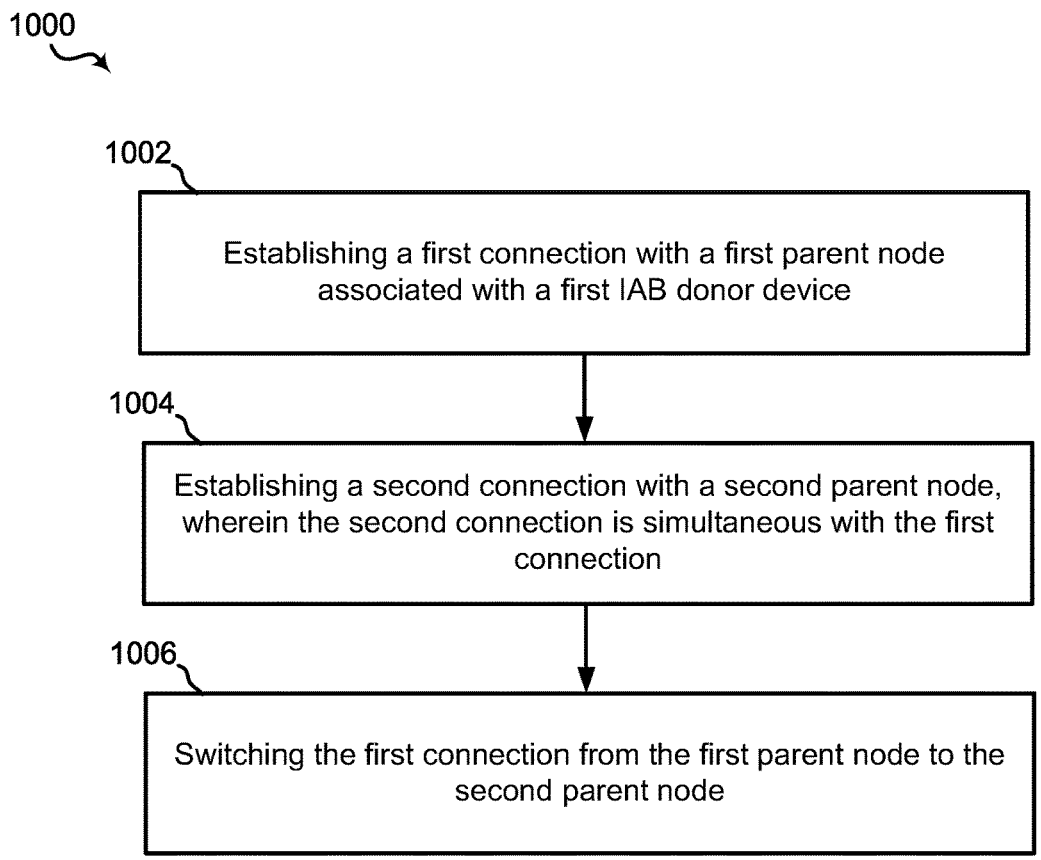
FIG. 10 is flowchart of an example method performed by an IAB node (e.g., base station or UE) of FIG. 1, according to aspects of the present disclosure.

Referring to FIG. 10, an example method 1000 for wireless communications may be performed by a first IAB node 802 such as the IAB node 200 (e.g., UE 110 or base station 105) of the wireless communication network 100. For example, operations of the method 1000 may be performed by the IAB node component 142, the modem 140, the transceiver 202, the processor 212, the memory 216, and or any other component/subcomponent of the UE 110 or the IAB node component 142, the modem 144, the transceiver 302, the processor 312, the memory 316, and or any other component/subcomponent of the base station 105.

At block 1002, the method 1000 may include establishing a first connection with a first parent node associated with a first IAB donor device. For example, the IAB node component 142, the modem 140, the transceiver 202, the processor 212, and/or the memory 216 of the UE 110, and/or one or more additional components/subcomponents of the UE 110 (or the IAB node component 142, the modem 144, the transceiver 302, the processor 312, and/or the memory 316 of the base station 105, and/or one or more additional components/subcomponents of the base station 105) may be configured to or may comprise means for establishing a first connection with a first parent node associated with a first IAB donor device.

For example, the establishing the first connection at block 1002 may include establishing by the IAB node component 142, the modem 140, the transceiver 202, the processor 212, and/or the memory 216 of the UE 110 (or the IAB node component 142, the modem 144, the transceiver 302, the processor 312, and/or the memory 316 of the base station 105), the source path 820 (e.g., first connection) of FIG. 9A with the second IAB node 804 (e.g., first parent node) of FIG. 9A associated with the first IAB donor 810 (e.g., first IAB donor device) of FIG. 9A.

At block 1004, the method 1000 may include establishing a second connection with a second parent node, wherein the second connection is simultaneous with the first connection. For example, the IAB node component 142, the modem 140, the transceiver 202, the processor 212, and/or the memory 216 of the UE 110, and/or one or more additional components/subcomponents of the UE 110 (or the IAB node component 142, the modem 144, the transceiver 302, the processor 312, and/or the memory 316 of the base station 105, and/or one or more additional components/subcomponents of the base station 105) may be configured to or may comprise means for establishing a second connection with a second parent node, wherein the second connection is simultaneous with the first connection.

For example, the establishing the second connection at block 1004 may include establishing by the IAB node component 142, the modem 140, the transceiver 202, the processor 212, and/or the memory 216 of the UE 110 (or the IAB node component 142, the modem 144, the transceiver 302, the processor 312, and/or the memory 316 of the base station 105), the second path 920 (e.g., first connection) of FIG. 9B with the third IAB node 806 (e.g., second parent node) of FIG. 9B, wherein the source path 820 is simultaneous with the second path 920.

In an example, the second parent node is associated with the first IAB donor device or a second IAB donor device.

In an example, the second connection is established simultaneously with the first connection using one of an NR-DC technology, an MR-DC technology, a multi-MT technology, or a DAPS technology.

At block 1006, the method 1000 may include switching the first connection from the first parent node to the second parent node. For example, the IAB node component 142, the modem 140, the transceiver 202, the processor 212, and/or the memory 216 of the UE 110, and/or one or more additional components/subcomponents of the UE 110 (or the IAB node component 142, the modem 144, the transceiver 302, the processor 312, and/or the memory 316 of the base station 105, and/or one or more additional components/subcomponents of the base station 105) may be configured to or may comprise means for switching the first connection from the first parent node to the second parent node.

For example, the switching the first connection at block 1006 may include switching by the IAB node component 142, the modem 140, the transceiver 202, the processor 212, and/or the memory 216 of the UE 110 (or the IAB node component 142, the modem 144, the transceiver 302, the processor 312, and/or the memory 316 of the base station 105), the source path 820 (e.g., first connection) of FIGS. 9C and 9D from the second IAB node 804 (e.g., first parent node) of FIGS. 9C and 9D to the third IAB node 806 (e.g., second parent node) of FIGS. 9C and 9D. In an example, switching the first connection to the second parent node may be performed by a handover 930 of FIG. 9C.

In an example, the first IAB node 802 may release one of the first connection or the second connection in response to the first connection being switched to the second parent node. In another example, the first IAB node 802 may automatically release the second connection in response to the first connection being switched to the second parent node.

In an example, the first IAB node 802 may switch the second connection from the second parent node to a third parent node. In some examples, the second connection is switched from the second parent node to the third parent node in response to the first connection being switched to the second parent node. In some examples, the second connection is switched from the second parent node to the third parent node concurrently with the first connection being switched to the second parent node.

In an example, the first connection is switched to a same cell served by the second parent node as that of the second connection.

In another example, the first connection is switched to a first cell served by the second parent node, the second connection is coupled with a second cell served by the second parent node, the first cell being different from the second cell. In some examples, the first cell includes one or more of a first physical cell identification (PCI), a first global cell identification (GCI), or a first frequency different from a second PCI, a second GCI, or a second frequency of the second cell.

In an example, the first IAB node 802 may transmit, to the first IAB donor device, a second IAB donor device, or a network node that controls the first IAB donor device or the second IAB donor device, an indication of capabilities of the first IAB node to switch the first connection to a same parent node as the second connection, wherein the first connection is switched from the first parent node to the second parent node in response to the indication being transmitted.

Figure 11:
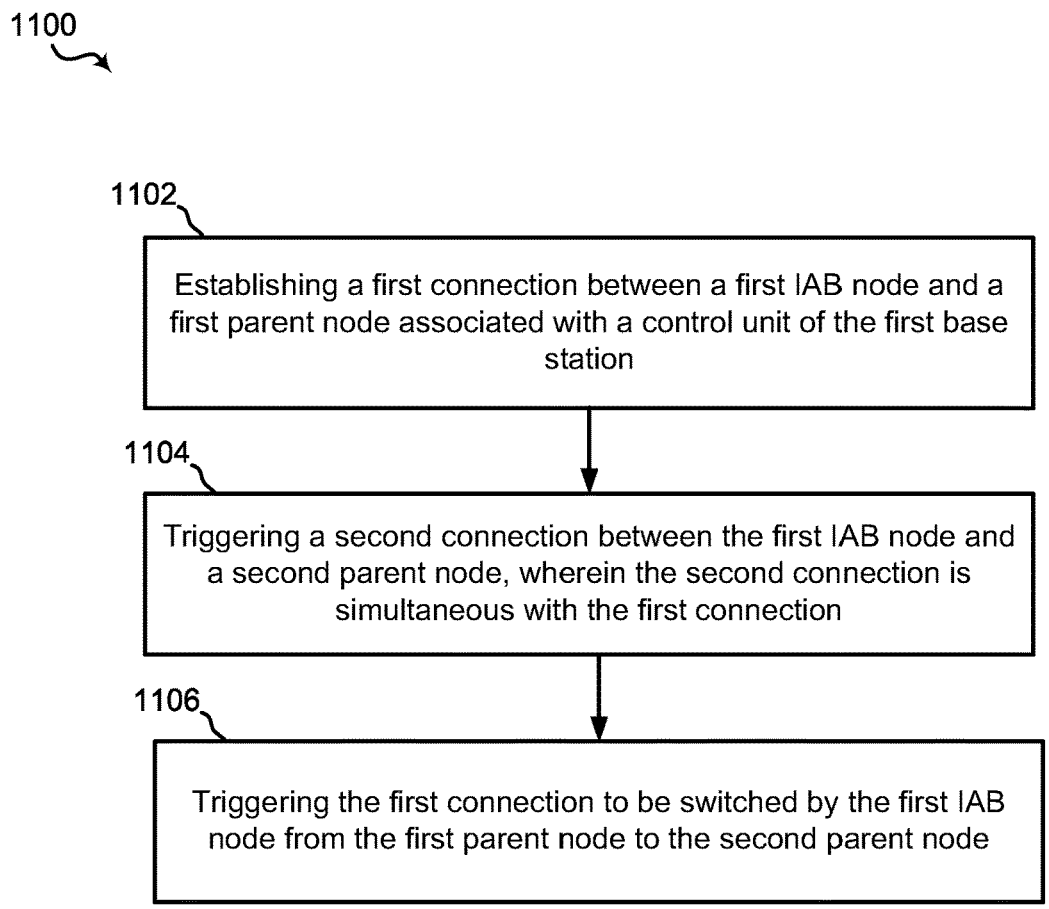
FIG. 11 is flowchart of an example method performed by a first IAB donor (e.g., base station) of FIG. 1, according to aspects of the present disclosure.

Referring to FIG. 11, an example of a method 1100 for wireless communications may be performed by the base station 105 (e.g., IAB donor 810 of FIG. 9A) of the wireless communication network 100. For example, operations of the method 1100 may be performed by the IAB donor component 146, the modem 144, the transceiver 302, the processor 312, the memory 316, and or any other component/subcomponent of the base station 105.

At block 1102, the method 1100 may include establish a first connection between a first IAB node and a first parent node associated with a control unit of the first base station. For example, the IAB donor component 146, the modem 144, the transceiver 302, the processor 312, and/or the memory 316 of the base station 105, and/or one or more additional components/subcomponents of the base station 105 may be configured to or may comprise means for establishing a first connection between a first IAB node and a first parent node associated with a control unit of the first base station.

For example, the establishing the first connection at block 1102 may include establishing by the IAB donor component 146, the modem 144, the transceiver 302, the processor 312, and/or the memory 316 of the base station 105, and/or one or more additional components/subcomponents of the base station 105, the source path 820 (e.g., first connection) of FIG. 9A between the first IAB node 802 and the second IAB node 804 (e.g., first parent node) associated with CU1 of the first IAB donor 810 (e.g., base station).

At block 1104, the method 1100 may include triggering a second connection between the first IAB node and a second parent node, wherein the second connection is simultaneous with the first connection. For example, the IAB donor component 146, the modem 144, the transceiver 302, the processor 312, and/or the memory 316 of the base station 105, and/or one or more additional components/subcomponents of the base station 105 may be configured to or may comprise means for triggering a second connection between the first IAB node and a second parent node, wherein the second connection is simultaneous with the first connection. In an example, the IAB-node may initiate an SN addition procedure and receive an RRC message upon which it adds the second connection.

For example, the triggering the second connection at block 1104 may include triggering by the IAB donor component 146, the modem 144, the transceiver 302, the processor 312, and/or the memory 316 of the base station 105, and/or one or more additional components/subcomponents of the base station 105, the second source path 920 (e.g., second connection) of FIG. 9B between the first IAB node 802 and the third IAB node 806 (e.g., second parent node) of FIG. 9B, wherein the second source path 920 is simultaneous with the first source path 820.

At block 1106, the method 1100 may include triggering the first connection to be switched by the first IAB node from the first parent node to the second parent node. For example, the IAB donor component 146, the modem 144, the transceiver 302, the processor 312, and/or the memory 316 of the base station 105, and/or one or more additional components/subcomponents of the base station 105 may be configured to or may comprise means for triggering the first connection to be switched by the first IAB node from the first parent node to the second parent node.

For example, the triggering the first connection at block 1106 may include triggering by the IAB donor component 146, the modem 144, the transceiver 302, the processor 312, and/or the memory 316 of the base station 105, and/or one or more additional components/subcomponents of the base station 105, the source path 820 (e.g., first connection) of FIG. 9C to be switched by the first IAB node 802 from the second IAB node 804 (e.g., first parent node) to the third IAB node 806 (e.g., second parent node). In an example, the IAB-node may initiate an MN handover and receive an RRC message upon which it switches the MN connection.

Figure 12:
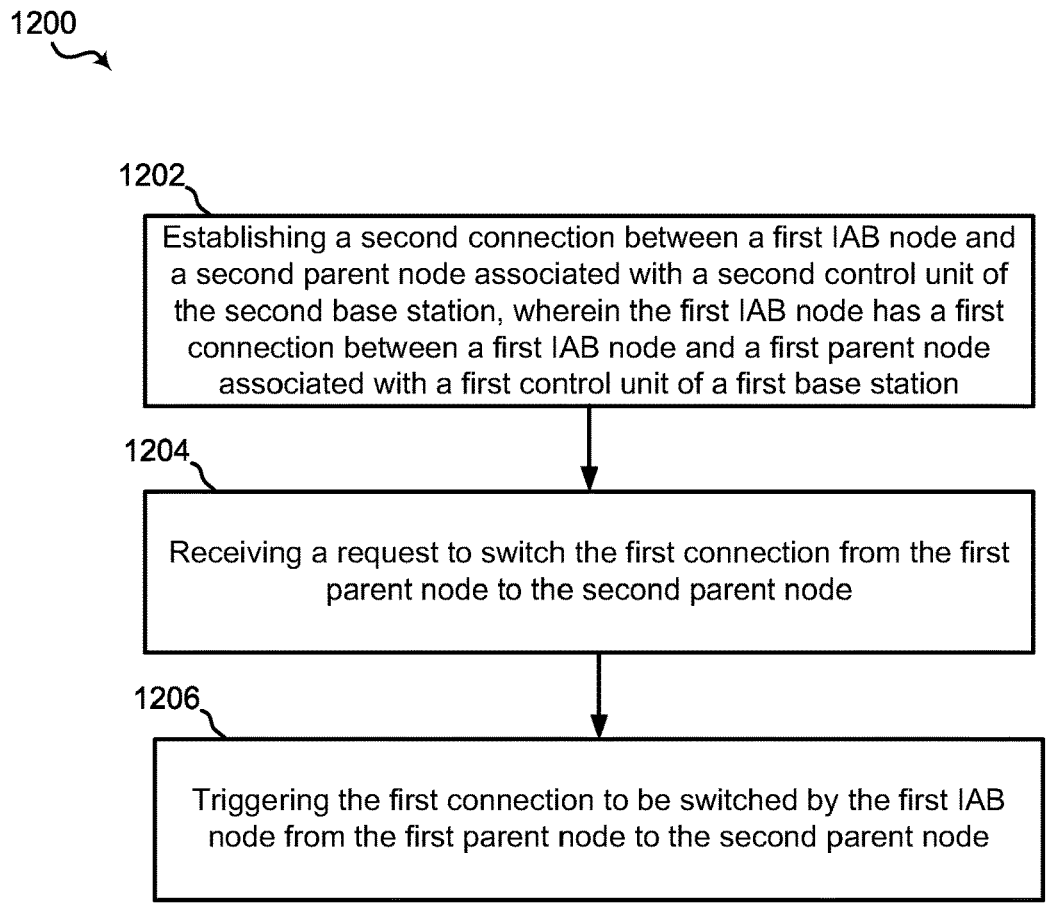
FIG. 12 is flowchart of an example method performed by a second IAB donor (e.g., base station) of FIG. 1, according to aspects of the present disclosure.

Referring to FIG. 12, an example of a method 1200 for wireless communications may be performed by the base station 105 (e.g., second IAB donor 812 of FIG. 9A) of the wireless communication network 100. For example, operations of the method 1100 may be performed by the IAB donor component 146, the modem 144, the transceiver 302, the processor 312, the memory 316, and or any other component/subcomponent of the base station 105.

At block 1202, the method 1200 may include establishing a second connection between a first IAB node and a second parent node associated with a second control unit of the second base station, wherein the first IAB node has a first connection between a first IAB node and a first parent node associated with a first control unit of a first base station. For example, the IAB donor component 146, the modem 144, the transceiver 302, the processor 312, and/or the memory 316 of the base station 105, and/or one or more additional components/subcomponents of the base station 105 may be configured to or may comprise means for establishing a second connection between a first IAB node and a second parent node associated with a second control unit of the second base station, wherein the first IAB node has a first connection between a first IAB node and a first parent node associated with a first control unit of a first base station.

For example, the establishing the second connection at block 1202 may include establishing by the IAB donor component 146, the modem 144, the transceiver 302, the processor 312, and/or the memory 316 of the base station 105, and/or one or more additional components/subcomponents of the base station 105, the second source path 920 (e.g., second connection) of FIG. 9A between the first IAB node of FIG. 9A and the third IAB node 806 (e.g., second parent node) associated with CU2 (e.g., second control unit) of the second IAB donor device 812 (second base station) of FIG. 9A, wherein the first IAB node 802 has the source path 820 (e.g., first connection) between the first IAB node 802 and the second IAB node 804 (e.g., first parent node) of FIG. 9A associated with CU1 (e.g., first control unit) of the first IAB donor device 810 (e.g., first base station).

At block 1204, the method 1200 may include receiving, from the first base station, a request to switch the first connection form the first parent node to the second parent node. For example, the IAB donor component 146, the modem 144, the transceiver 302, the processor 312, and/or the memory 316 of the base station 105, and/or one or more additional components/subcomponents of the base station 105 may be configured to or may comprise means for receiving, from the first base station, a request to switch the first connection form the first parent node to the second parent node.

For example, the receiving the request at block 1204 may include receiving by the IAB donor component 146, the modem 144, the transceiver 302, the processor 312, and/or the memory 316 of the base station 105, and/or one or more additional components/subcomponents of the base station 105, from the first IAB donor device 810 (e.g., first base station), a request to switch the source path 820 (e.g., first connection) from the second IAB node 804 (e.g., first parent node) to the third IAB node 806 (second parent node).

At block 1206, the method 1200 may include triggering the first connection to be switched by the first IAB node from the first parent node to the second parent node. For example, the IAB donor component 146, the modem 144, the transceiver 302, the processor 312, and/or the memory 316 of the base station 105, and/or one or more additional components/subcomponents of the base station 105 may be configured to or may comprise means for triggering the first connection to be switched by the first IAB node from the first parent node to the second parent node.

For example, the triggering the first connection at block 1206 may include triggering by the IAB donor component 146, the modem 144, the transceiver 302, the processor 312, and/or the memory 316 of the base station 105, and/or one or more additional components/subcomponents of the base station 105, the source path 820 (e.g., first connection) to be switched (e.g., handover 930) by the first IAB node 802 from the second IAB node 804 (e.g., first parent node) to the third IAB node 806 (e.g., second parent node).

Additional Implementations

An example method of wireless communication for a first IAB node, comprising: establishing a first connection with a first parent node associated with a first IAB donor device; establishing a second connection with a second parent node, wherein the second connection is simultaneous with the first connection; and switching the first connection from the first parent node to the second parent node.

The above example method, wherein the second parent node is associated with the first IAB donor device or a second IAB donor device.

One or more of the above example methods, wherein the first connection is switched to a same cell served by the second parent node as that of the second connection.

One or more of the above example methods, wherein the first connection is switched to a first cell served by the second parent node, the second connection is coupled with a second cell served by the second parent node, the first cell being different from the second cell.

One or more of the above example methods, wherein the first cell includes one or more of a first PCI, a first GCI, or a first frequency different from a second PCI, a second GCI, or a second frequency of the second cell.

One or more of the above example methods, wherein the second connection is established simultaneously with the first connection using one of an NR-DC technology, an MR-DC technology, a multi-MT technology, or a DAPS technology.

One or more of the above example methods, further comprising: releasing one of the first connection or the second connection in response to the first connection being switched to the second parent node.

One or more of the above example methods, further comprising: automatically releasing the second connection in response to the first connection being switched to the second parent node.

One or more of the above example methods, further comprising: switching the second connection from the second parent node to a third parent node.

One or more of the above example methods, wherein the second connection is switched from the second parent node to the third parent node in response to the first connection being switched to the second parent node.

One or more of the above example methods, wherein the second connection is switched from the second parent node to the third parent node concurrently with the first connection being switched to the second parent node.

One or more of the above example methods, further comprising: transmitting, to one of the first IAB donor device, a second IAB donor device, or a network node that controls the first IAB donor device or the second IAB donor device, an indication of capabilities of the first IAB node to switch the first connection to a same parent node as the second connection, wherein the first connection is switched from the first parent node to the second parent node in response to the indication being transmitted.

One or more of the above example methods, wherein the first IAB node is one of a base station, a UE, or a relay device.

An example first IAB node, comprising: a memory storing instructions; and one or more processors coupled with the memory and configured to: establish a first connection with a first parent node associated with a first IAB donor device; establish a second connection with a second parent node, wherein the second connection is simultaneous with the first connection; and switch the first connection from the first parent node to the second parent node.

The above example first IAB node, wherein the second parent node is associated with the first IAB donor device or a second IAB donor device.

One or more of the above example first IAB nodes, wherein the first connection is switched to a same cell served by the second parent node as that of the second connection.

One or more of the above example first IAB nodes, wherein the first connection is switched to a first cell served by the second parent node, the second connection is coupled with a second cell served by the second parent node, the first cell being different from the second cell.

One or more of the above example first IAB nodes, wherein the first cell includes one or more of a first PCI, a first GCI, or a first frequency different from a second PCI, a second GCI, or a second frequency of the second cell.

One or more of the above example first IAB nodes, wherein the second connection is established simultaneously with the first connection using one of an NR-DC technology, an MR-DC technology, a multi-MT technology, or a DAPS technology.

One or more of the above example first IAB nodes, wherein the one or more processors is further configured to: release one of the first connection or the second connection in response to the first connection being switched to the second parent node.

One or more of the above example first IAB nodes, wherein the one or more processors is further configured to: automatically release the second connection in response to the first connection being switched to the second parent node.

One or more of the above example first IAB nodes, wherein the one or more processors is further configured to: switch the second connection from the second parent node to a third parent node.

One or more of the above example first IAB nodes, wherein the second connection is switched from the second parent node to the third parent node in response to the first connection being switched to the second parent node.

One or more of the above example first IAB nodes, wherein the second connection is switched from the second parent node to the third parent node concurrently with the first connection being switched to the second parent node.

One or more of the above example first IAB nodes, wherein the one or more processors is further configured to: transmit, to one of the first IAB donor device, a second IAB donor device, or a network node that controls the first IAB donor device or the second IAB donor device, an indication of capabilities of the first IAB node to switch the first connection to a same parent node as the second connection, wherein the first connection is switched from the first parent node to the second parent node in response to the indication being transmitted.

One or more of the above example first IAB nodes, wherein the first IAB node is one of a base station, a UE, or a relay device.

A second example method of wireless communication for a first base station, comprising: establishing a first connection between a first IAB node and a first parent node associated with a control unit of the first base station; triggering a second connection between the first IAB node and a second parent node, wherein the second connection is simultaneous with the first connection; and triggering the first connection to be switched by the first IAB node from the first parent node to the second parent node.

The above second example method, further comprising: transmitting, to the second parent node, an indication that the second parent node serves the IAB node on the second connection.

One or more of the above second example methods, further comprising: transmitting, to the second parent node, a request for separate resources for the first connection and the second connection.

One or more of the above second example methods, further comprising: transmitting, to the second parent node, a request for combined resources for the first connection and the second connection.

One or more of the above second example methods, further comprising: transmitting, to the second parent node, a request to release the second connection.

One or more of the above second example methods, further comprising: transmitting, to a second base station, a request to switch the first connection from the first parent node to the second parent node, wherein the first connection is triggered in response to the request being received.

An example first base station, comprising: a memory storing instructions; and one or more processors coupled with the memory and configured to: establish a first connection between a first IAB node and a first parent node associated with a control unit of the first base station; trigger a second connection between the first IAB node and a second parent node, wherein the second connection is simultaneous with the first connection; and trigger the first connection to be switched by the first IAB node from the first parent node to the second parent node.

The above example first base station, wherein the one or more processors is further configured to: transmit, to the second parent node, an indication that the second parent node serves the IAB node on the second connection.

One or more of the above example first base stations, wherein the one or more processors is further configured to: transmit, to the second parent node, a request for separate resources for the first connection and the second connection.

One or more of the above example first base stations, wherein the one or more processors is further configured to: transmit, to the second parent node, a request for combined resources for the first connection and the second connection.

One or more of the above second example methods, further comprising: transmitting, to the second parent node, a request to release the second connection.

One or more of the above example first base stations, wherein the one or more processors is further configured to: transmit, to a second base station, a request to switch the first connection from the first parent node to the second parent node, wherein the first connection is triggered in response to the request being received.

A third example method of wireless communication for a second base station, comprising: establishing a second connection between a first IAB node and a second parent node associated with a second control unit of the second base station, wherein the first IAB node has a first connection between a first IAB node and a first parent node associated with a first control unit of a first base station; receiving, from the first base station, a request to switch the first connection from the first parent node to the second parent node; and triggering the first connection to be switched by the first IAB node from the first parent node to the second parent node.

The above third example method, further comprising: receiving, from the first base station associated with the first parent node, a request to switch the first connection from the first parent node to the second parent node, wherein the first connection is triggered in response to the request being received.

One or more of the above third example methods, further comprising: transmitting, to the second parent node, a request for separate resources for the first connection and the second connection.

One or more of the above third example methods, further comprising: transmitting, to the second parent node, a request for combined resources for the first connection and the second connection.

One or more of the above third example methods, further comprising: transmitting, to the second parent node, a request to release the second connection.

One or more of the above third example methods, further comprising: transmitting, to the second parent node, an indication that the second parent node serves the IAB node on the second connection.

An example second base station, comprising: a memory storing instructions; and one or more processors coupled with the memory and configured to: establish a second connection between a first IAB node and a second parent node associated with a second control unit of the second base station, wherein the first IAB node has a first connection between a first IAB node and a first parent node associated with a first control unit of a first base station; receive, from the first base station, a request to switch the first connection from the first parent node to the second parent node; and trigger the first connection to be switched by the first IAB node from the first parent node to the second parent node.

The above example second base station, wherein the one or more processors is further configured to: receive, from the first base station associated with the first parent node, a request to switch the first connection from the first parent node to the second parent node, wherein the first connection is triggered in response to the request being received.

One or more of the above second base stations, wherein the one or more processors is further configured to: transmit, to the second parent node, a request for separate resources for the first connection and the second connection.

One or more of the above second base stations, wherein the one or more processors is further configured to: transmitting, to the second parent node, a request for combined resources for the first connection and the second connection.

One or more of the above second base stations, wherein the one or more processors is further configured to: transmitting, to the second parent node, a request to release the second connection.

One or more of the above second base stations, wherein the one or more processors is further configured to: transmitting, to the second parent node, an indication that the second parent node serves the IAB node on the second connection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication for a first integrated access and backhaul (IAB) node, comprising:
establishing a first connection with a first parent node associated with a first IAB donor device;
establishing a second connection with a second parent node, wherein the second connection is simultaneous with the first connection; and
switching the first connection from the first parent node to the second parent node,
wherein the second connection is switched from the second parent node to the third parent node in response to the first connection being switched to the second parent node, or wherein the second connection is switched from the second parent node to the third parent node concurrently with the first connection being switched to the second parent node.

2. The method of claim 1, wherein the second parent node is associated with the first IAB donor device or a second IAB donor device.

3. The method of claim 1, wherein the first connection is switched to a same cell served by the second parent node as that of the second connection.

4. The method of claim 1, wherein the first connection is switched to a first cell served by the second parent node, the second connection is coupled with a second cell served by the second parent node, the first cell being different from the second cell.

5. The method of claim 4, wherein the first cell includes one or more of a first physical cell identification (PCI), a first global cell identification (GCI), or a first frequency different from a second PCI, a second GCI, or a second frequency of the second cell.

6. The method of claim 1, wherein the second connection is established simultaneously with the first connection using one of a new radio dual connectivity (NR-DC) technology, a multi-radio access technology dual connectivity (MR-DC) technology, a multi-mobile termination (multi-MT) technology, or a dual active protocol stack (DAPS) technology.

7. The method of claim 1, further comprising:
releasing one of the first connection or the second connection in response to the first connection being switched to the second parent node.

8. The method of claim 1, further comprising:
automatically releasing the second connection in response to the first connection being switched to the second parent node.

9. The method of claim 1, wherein the second connection is switched from the second parent node to the third parent node in response to the first connection being switched to the second parent node.

10. The method of claim 1, wherein the second connection is switched from the second parent node to the third parent node concurrently with the first connection being switched to the second parent node.

11. The method of claim 1, wherein the first IAB node is one of a base station, a user equipment (UE), or a relay device.

12. A method of wireless communication for a first integrated access and backhaul (IAB) node, comprising:
establishing a first connection with a first parent node associated with a first IAB donor device;
establishing a second connection with a second parent node, wherein the second connection is simultaneous with the first connection;
transmitting, to one of the first IAB donor device, a second IAB donor device, or a network node that controls the first IAB donor device or the second IAB donor device, an indication of capabilities of the first TAB node to switch the first connection to a same parent node as the second connection; and
switching the first connection from the first parent node to the second parent node, wherein the first connection is switched from the first parent node to the second parent node in response to the indication being transmitted.

13. A first integrated access and backhaul (IAB) node, comprising:
one or more memories storing instructions; and
one or more processors coupled with the one or more memories and configured to execute the instructions to:
establish a first connection with a first parent node associated with a first IAB donor device;
establish a second connection with a second parent node, wherein the second connection is simultaneous with the first connection; and
switch the first connection from the first parent node to the second parent node,
switch the second connection from the second parent node to the third parent node in response to the first connection being switched to the second parent node, or switch the second connection from the second parent node to the third parent node concurrently with the first connection being switched to the second parent node.

14. The first IAB node of claim 13, wherein the second parent node is associated with the first IAB donor device or a second IAB donor device.

15. The first IAB node of claim 13, wherein the one or more processors are configured to execute the instructions to switch the first connection to a same cell served by the second parent node as that of the second connection.

16. The first IAB node of claim 13, wherein the one or more processors are configured to execute the instructions to switch the first connection to a first cell served by the second parent node, the second connection is coupled with a second cell served by the second parent node, the first cell being different from the second cell.

17. The first IAB node of claim 16, wherein the first cell includes one or more of a first physical cell identification (PCI), a first global cell identification (GCI), or a first frequency different from a second PCI, a second GCI, or a second frequency of the second cell.

18. The first IAB node of claim 13, wherein the one or more processors are configured to execute the instructions to establish the second connection simultaneously with the first connection using one of a new radio dual connectivity (NR-DC) technology, a multi-radio access technology dual connectivity (MR-DC) technology, a multi-mobile termination (multi-MT) technology, or a dual active protocol stack (DAPS) technology.

19. The first IAB node of claim 13, wherein the one or more processors are configured to execute the instructions to:
release one of the first connection or the second connection in response to the first connection being switched to the second parent node.

20. The first IAB node of claim 13, wherein the one or more processors are configured to execute the instructions to:
  automatically release the second connection in response to the first connection being switched to the second parent node.

21. The first IAB node of claim 13, wherein the one or more processors are configured to execute the instructions to switch the second connection from the second parent node to the third parent node in response to the first connection being switched to the second parent node.

22. The first IAB node of claim 13, wherein the one or more processors are configured to execute the instructions to switch the second connection from the second parent node to the third parent node concurrently with the first connection being switched to the second parent node.

23. The first IAB node of claim 13, wherein the first IAB node is one of a base station, a user equipment (UE), or a relay device.

24. A first integrated access and backhaul (IAB) node, comprising:
  one or more memories storing instructions; and
  one or more processors coupled with the one or more memories and configured to execute the instructions to:
    establish a first connection with a first parent node associated with a first IAB donor device;
    establish a second connection with a second parent node, wherein the second connection is simultaneous with the first connection;
    transmit, to one of the first IAB donor device, a second IAB donor device, or a network node that controls the first IAB donor device or the second IAB donor device, an indication of capabilities of the first IAB node to switch the first connection to a same parent node as the second connection; and
    switch the first connection from the first parent node to the second parent node, wherein the first connection is switched from the first parent node to the second parent node in response to the indication being transmitted.

* * * * *